Patented Mar. 9, 1948

2,437,545

UNITED STATES PATENT OFFICE 2,437,545

BASIC AMIDES OF 1-ARYL-CYCLOALKYL-1-CARBOXYLIC ACIDS

Henry Martin and Franz Häfliger, Basel, Switzerland, assignors to J. R. Geigy A.-G., Basel, Switzerland, a firm No Drawing. Original application June 2, 1944, Serial No. 538,542. Divided and this application July 26, 1945, Serial No. 607,274

6 Claims. (Cl. 260—558)

The present application is a divisional patent application of our copending application Ser. No. 538,542, filed on June 2, 1944, now U. S. Patent 2,404,588, as a continuation-in-part application of our application Ser. No. 506,760, filed on October 18, 1943, which is abandoned.

Therapeutically valuable compounds selected from the series of the cycloalkyl-monocarboxylic acids or of their homologues and substitution products respectively have not become known hitherto. It has now been found that the basic amides of cycloalkyl-1-carboxylic acids arylated in 1-position possess very valuable therapeutical properties. These compounds are produced by aminating the carboxylic acids with suitable diamines.

For the preparation of the amides either 1-aryl-cycloalkyl-1-carboxylic acids are interacted with alkylene diamines containing a primary or secondary and at least one tertiary amino group, or reactive esters of corresponding amino alcohols are caused to react with metal salts, especially with alkali salts of 1-arylated cycloalkyl-1-carboxylic acid amides. The amides are also obtained in an indirect manner by interaction of the cycloalkyl carboxylic acids or derivatives or substitution products thereof with amino alcohols having a primary or secondary amino group or by causing alkylene halogen hydrines or alkylene dihalides to react with amides of cycloalkyl-1-carboxylic acids arylated in 1-position and containing 1 to 2 hydrogen atoms in the amide group, or in some cases also with metal compounds of the said amides, and replacing the external substitutent in the so-obtained hydroxy alkyl or esterified hydroxy-alkyl amides by a disubstituted amino groups.

By addition of alkyl halides, alkylene halides, aryl sulphonic acid esters, dialkyl sulfates, aralkyl halides and so on the quaternary compounds of the above amides are obtained in the usual manner. If, for the conversion of the cycloalkyl-carboxylic acid, halogen alkyl amides, tertiary amines, like trimethyl amine or triethylamine, are used, the quaternary ammonium compounds are directly obtained.

The 1-aryl-cycloalkyl-1-carboxylic acids are mostly known; the compounds not known hitherto can be produced in the same manner like the corresponding products described in the literature.

The present invention may be illustrated, but not limited, by the following examples, the parts being by weight, unless otherwise stated.

Example 1

20.8 parts of 1-phenyl-1-cyclopentyl-1-carboxylic acid chloride, obtained from the acid (cf. Am. Soc., 1934, 56, 715) by means of thionylchloride, are dissolved in 200 parts by volume of absolute benzene; then, a solution of 12 parts of N,N-diethyl ethylene diamine in 100 parts by volume of absolute benzene is allowed to drop thereinto, whereupon the whole mixture is heated for 10 minutes under reflux. The hydrochloride of the new base which is formed is filtered off and dissolved in water. The aqueous solution is made alkaline with potassium carbonate solution and shaken out with ether; the etheral solution is washed with water, dried over potassium carbonate and the solvent is distilled off. The base boils at 0.03 mm. pressure at 140–142° C.

20.8 parts of 1-phenyl-cyclopentyl-1-carboxylic acid chloride and 13 parts of N:N-diethyl-N'-methyl ethylene diamine lead to a base of the boiling point of 138°–140° C. at 0.05 mm. pressure.

When using 25 parts of 1-(3':4'-dimethylphenyl)-cyclohexyl-1-carboxylic acid chloride and 15 parts of N:N-diethyl-N'-ethyl ethylene diamine, there results a base of the boiling point of 159°–161° C. at 0.04 mm. pressure.

Example 2

40 parts of 1-phenyl-cyclohexyl-1-carboxylic acid amide and 8 parts of sodium amide are heated for 6 hours to boiling under reflux in 400 parts of toluene, whereupon the calculated quantity of β-chloroethyl diethyl amine is slowly added thereto and the whole is further heated, until the reaction is completed. After cooling, the toluene solution is shaken with diluted hydrochloric acid and the new base separated in the usual manner from the filtered, aqueous solution. The 1-phenyl-cyclohexyl - 1 - carboxylic acid diethyl amino ethyl amide boils at 0.03 mm. pressure at 148°–150° C.

The same base can also be produced by heating 1-phenyl-cyclohexyl-1-carboxylic acid with 2-diethylamino ethyl amine to 200° C. or by boiling for several hours the methyl or ethyl ester of the corresponding acid with the amine.

By the analogous condensation of 1-phenyl-cyclopentyl-1-carboxylic acid amide, 1-phenyl-cyclopentyl-1-carboxylic acid methyl or ethyl amide as well as of 1-phenyl-cyclohexyl-1-carboxylic acid methyl or ethyl amide with diethyl amino ethyl chloride the corresponding amides are obtained.

Example 3

41 parts of 1-phenyl-cyclopentyl-1-carboxylic acid and 12 parts of amino ethanol are heated for 2 hours at 200° C., the water being formed during the condensation being allowed to distil off. After completion of the interaction the resulting 1-phenyl-cyclopentyl-1-carboxylic acid-β-hydroxy ethyl amide is dissolved in chloroform and heated for 2 hours at 60° C. with the calculated quantity of phosphorus pentachloride. The reaction mass is extracted with ether, the ethereal solution washed with sodium carbonate and water and then dried over potassium carbonate. After evaporation of the solvent, the 1-phenyl-cyclopentyl-1-carboxylic acid-β-chloroethyl amide is obtained as a bright oil.

27.5 parts of this compound are heated for 10 hours to 130° C. with 18 parts of diethyl amine. Then it is dissolved in diluted hydrochloric acid, filtered and the 1-phenyl-cyclopentyl-1-carboxylic acid diethyl amino ethyl amide is precipitated from the aqueous solution by means of sodium carbonate. The base possesses the boiling point of 140°–142° C. at 0.03 mm. pressure.

Instead of phenyl-cycloalkyl carboxylic acids the analogous compounds of the naphthalene series, such as for instance 1-α- or 1-β-naphthyl-cyclohexyl-1-carboxylic acid, can be used likewise.

What we claim is:

1. The basic amides of 1-aryl-cycloalkyl-1-carboxylic acids of the general formula

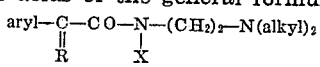

wherein aryl means a member selected from the group consisting of the unsubstituted phenyl radicals and the phenyl radicals substituted by methyl groups, R means a member of the group consisting of tetramethylene and pentamethylene radicals and X stands for a member selected from the group consisting of H and alkyl.

2. The basic amides of 1-aryl-cycloalkyl-1-carboxylic acids of the general formula

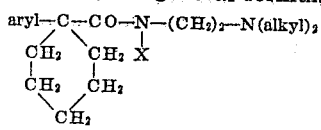

wherein aryl means a member selected from the group consisting of the unsubstituted phenyl radicals and the phenyl radicals substituted by methyl groups and X stands for a member selected from the group consisting of H and alkyl.

3. The basic amides of 1-aryl-cycloalkyl-1-carboxylic acids of the general formula

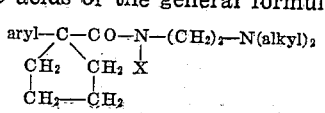

wherein aryl means a member selected from the group consisting of the unsubstituted phenyl radicals and the phenyl radicals substituted by methyl groups and X stands for a member selected from the group consisting of H and alkyl.

4. The 1-phenyl-cyclopentyl-1-carboxylic acid diethyl-amino ethylamide of the formula

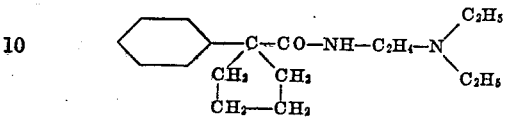

being a colorless liquid boiling at 140°–142° C. at 0.03 mm. pressure.

5. The 1-(3':4'-dimethylphenyl)-cyclohexyl-1-carboxylic acid N':N'-diethylamino ethyl-(N-ethyl)-amide of the formula

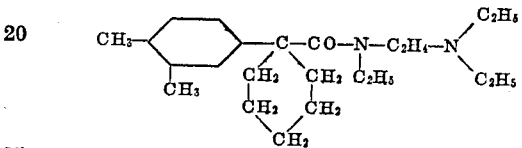

being a colorless liquid boiling at 159°–161° C. at 0.04 mm. pressure.

6. The 1-phenyl-cyclopentyl-1-carboxylic acid N':N'-diethylamino ethyl-(N-methyl)-amide of the formula

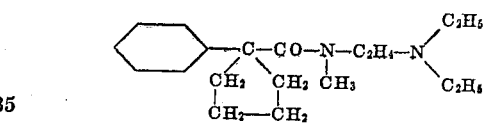

being a liquid boiling at 138°–140° C. at 0.05 mm. pressure.

HENRY MARTIN.
FRANZ HÄFLIGER.

REFERENCES CITED

The following references are of record in the file of this patent:

UNITED STATES PATENTS

| Number | Name | Date |
|---|---|---|
| 2,009,144 | Miescher et al. | July 23, 1935 |
| 2,139,687 | Lott | Dec. 13, 1938 |
| 2,310,973 | Lott | Feb. 16, 1943 |

FOREIGN PATENTS

| Number | Country | Date |
|---|---|---|
| 215,776 | Switzerland | Oct. 16, 1941 |